(12) United States Patent
O'Brien et al.

(10) Patent No.: US 7,243,195 B2
(45) Date of Patent: Jul. 10, 2007

(54) SOFTWARE MANAGED CACHE OPTIMIZATION SYSTEM AND METHOD FOR MULTI-PROCESSING SYSTEMS

(75) Inventors: John Kevin Patrick O'Brien, South Salem, NY (US); Kathryn M. O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 11/002,553

(22) Filed: Dec. 2, 2004

(65) Prior Publication Data

US 2006/0123405 A1 Jun. 8, 2006

(51) Int. Cl.
*G06F 12/00* (2006.01)
(52) U.S. Cl. .................... 711/159; 711/118; 711/165
(58) Field of Classification Search ............. 711/118, 711/159, 165
See application file for complete search history.

(56) References Cited

U.S. PATENT DOCUMENTS

| | | | | |
|---|---|---|---|---|
| 5,764,885 A | * | 6/1998 | Sites et al. ............... | 714/45 |
| 6,006,033 A | * | 12/1999 | Heisch .................... | 717/158 |
| 6,237,073 B1 | * | 5/2001 | Dean et al. ............... | 711/202 |

2006/0123401 A1 6/2006 O'Brien et al.

* cited by examiner

*Primary Examiner*—Reba I. Elmore
(74) *Attorney, Agent, or Firm*—Stephen J. Walder, Jr.; Diana R. Gerhardt; Robert M. Carwell

(57) ABSTRACT

The present invention provides for a method for computer program code optimization for a software managed cache in either a uni-processor or a multi-processor system. A single source file comprising a plurality of array references is received. The plurality of array references is analyzed to identify predictable accesses. The plurality of array references is analyzed to identify secondary predictable accesses. One or more of the plurality of array references is aggregated based on identified predictable accesses and identified secondary predictable accesses to generate aggregated references. The single source file is restructured based on the aggregated references to generate restructured code. Prefetch code is inserted in the restructured code based on the aggregated references. Software cache update code is inserted in the restructured code based on the aggregated references. Explicit cache lookup code is inserted for the remaining unpredictable accesses. Calls to a miss handler for misses in the explicit cache lookup code are inserted. A miss handler is included in the generated code for the program. In the miss handler, a line to evict is chosen based on recent usage and predictability. In the miss handler, appropriate DMA commands are issued for the evicted line and the missing line.

19 Claims, 2 Drawing Sheets

SOFTWARE MANAGED CACHE OPTIMIZATION SYSTEM AND METHOD FOR MULTI-PROCESSING SYSTEMS

CROSS-REFERENCED APPLICATIONS

This application relates to co-pending U.S. patent application entitled METHOD AND SYSTEM FOR EXPLOITING PARALLELISM ON A HETEROGENOUS MULTI-PROCESSOR COMPUTER SYSTEM Ser. No. 11/002,555, filed concurrently herewith.

TECHNICAL FIELD

The present invention relates generally to the field of computer program development and, more particularly, to a system and method for software managed cache optimization for multi-processing systems.

BACKGROUND

In many modern multiprocessor systems, it is generally assumed that peak or near peak performance will be achieved by splitting computational loads across all the nodes of the system. In systems with multiple processing units, one or more of the multiple processing units can be configured with a relatively small, non-cached local store, backed up with a larger main memory, accessed through direct memory access (DMA). A program compiled to run on the system, that is, a single-source program, can sometimes include more data than will fit at any one time into the local stores.

One approach to addressing local store capacity is to employ a software managed cache. Generally, as will be understood to one skilled in the art, a software managed cache is a computer program that can allocate certain data to be maintained in the local or system cache, to reduce lookup times associated with collecting data stored in the main memory. However, typical software managed cache solutions often incur latencies of their own, which can severely impact program performance.

Moreover, the utility of a computer system is achieved by the process of executing specially designed software, herein referred to as computer programs or codes, on the processing unit(s) of the system. These codes are typically produced by a programmer writing in a computer language and are prepared for execution on the computer system by the use of a compiler. The ease of the programming task, and the efficiency of the ultimate execution of the code on the computer system are greatly affected by the facilities offered by the compiler. Many modern simple compilers produce slowly executing code for a single processor. Other compilers have been constructed that produce relatively extremely rapidly executing code for one or more processors in a homogeneous multi-processing system. Designing code to operate in a multi-processing system with a software managed cache however, often requires a time-intensive and/or complicated analysis of the whole program before the benefits of optimizing the software managed cache outweigh the development effort and/or other timing latencies inherent in the program.

Therefore, there is a need for a system and/or method for software managed cache optimization for multi-processing systems that addresses at least some of the problems and disadvantages associated with conventional systems and methods.

SUMMARY OF THE INVENTION

The present invention provides for a method of using a software managed cache in conjunction with explicit data transfer in a computer system comprising at least one processing unit, with at least one directly addressed local store and at least one indirectly addressed system memory, where the system memory is typically much larger than the local store, and data movement between system memory and local store is controlled explicitly by software (DMA). A single source file comprising a plurality of data references is received, of which some number are references to array data. The plurality of data references is analyzed to identify predictable accesses, typically found in the array data. The plurality of data references is analyzed to identify secondary predictable accesses. Any remaining data accesses are typically non-predictable. One or more of the plurality of data references is aggregated based on identified predictable accesses and identified secondary predictable accesses to generate aggregated references. The single source file is restructured to distinguish the aggregated predictable references from the non-predictable accesses. Prefetch code is inserted in the restructured code based on the aggregated references. Software cache directory update code is inserted in the restructured code based on the aggregated references. References to non-predictable data elements are rewritten to include explicit software cache lookup. A miss handler is included in the program and is invoked to cause data transfer between one of the at least one local stores and one of the at least one system memories, when cache lookup fails.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for; the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
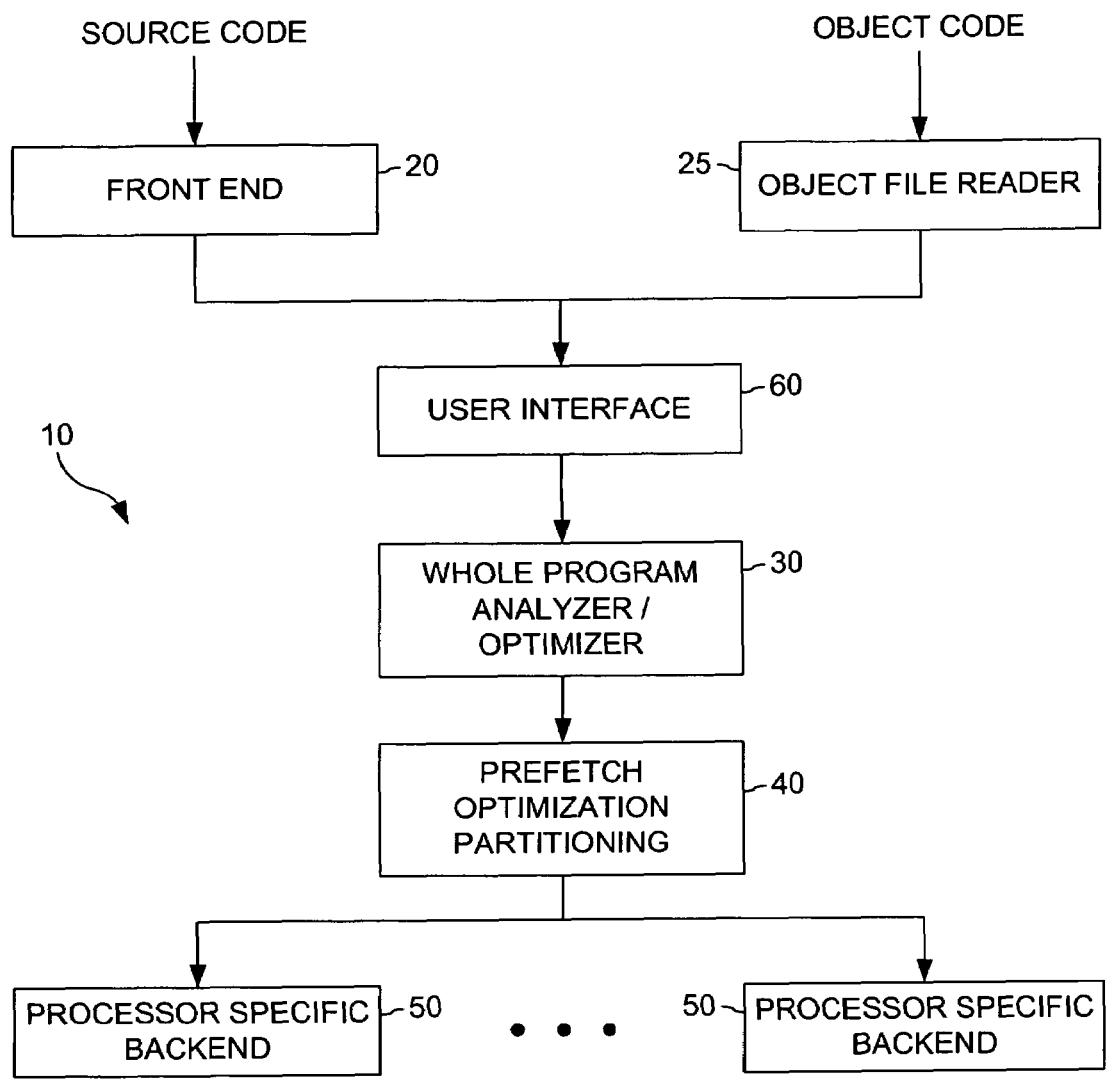
FIG. 1 is a block diagram depicting a software managed cache optimization system.

Referring to FIG. 1 of the drawings, the reference numeral 10 generally designates a compiler. Compiler 10 is a circuit or circuits or other suitable logic and is configured as a computer program code compiler. In a particular embodiment, compiler 10 is a software program configured to compile source code into object code, as described in more detail below. Generally, compiler 10 is configured to receive source code in front end code module 20, through user interface 60, and to receive object code through object file reader 25. The received code is then processed using parameters provided by whole program analyzer and optimizer 30 and prefetch optimization partitioning module 40, to generate processor specific back end code 50, as described in more detail below.

In particular, in the illustrated embodiment, complier 10 includes user interface 60. User interface 60 is a circuit or circuits or other suitable logic and is configured to receive input from a user, typically. In one embodiment, user interface 60 is a combination of inserted "pragmas" commands or directives in the program source code and compiler option flags provided on a command line, or in a "makefile" command or script. In another embodiment, a graphical user interface can be employed to provide this information. It will be understood to one skilled in the art that other configurations can also be employed.

Compiler 10 includes front end code module 20. Front end code module 20 is a circuit or circuits or other suitable logic and is configured to read source code and to identify particular parameters of the computer system on which compiled code is to be executed. Compiler 10 also includes object file reader module 25. Object file reader module 25 is a circuit or circuits or other suitable logic and is configured to read object code and to identify particular parameters of the computer system on which compiled code is to be executed. Generally, object code is the saved result of previously processing source code received by front end code module 20 through compiler 10 and storing information about said source code derived by analysis in the compiler. In a particular embodiment, object file reader module 25 is a software program and is configured to identify and map the various processing nodes of the computer system on which compiled code is to be executed, the "target" system. Additionally, object file reader module 25 can also be configured to identify the processing capabilities of identified nodes.

Compiler 10 also includes whole program analyzer and optimizer module 30. Whole program analyzer and optimizer module 30 is a circuit or circuits or other suitable logic and is configured to analyze received source and/or object code, as described in more detail below. In a particular embodiment, whole program analyzer and optimizer module 30 is a software program and is configured to create a whole program representation of received source and/or object code, and to analyze array references of the computer program code. Thus, generally, whole program analyzer and optimizer module 30 can be configured to analyze an entire computer program source code, that is, received source and/or object code, to identify array references of source and/or object code that depend in a somewhat predictable manner on a particular program variable, such as, for example, a loop induction variable. As used herein, an entire computer program source code is a set of lines of computer program code that make up a discrete computer program, as will be understood to one skilled in the art.

In particular, in one embodiment, whole program analyzer and optimizer module 30 is configured to receive source and/or object code and to create a whole program representation of received source and/or object code. As used herein, a whole program representation is a representation of the various code segments that make up an entire computer program source code. In one embodiment, whole program analyzer and optimizer module 30 is configured to perform Inter-Procedural Analysis on the received source and/or object code to create a whole program representation. It will be understood to one skilled in the art that other methods can also be employed to create a whole program representation of the received computer program source code.

In one embodiment, whole program analyzer and optimizer module 30 is also configured to perform dependence analysis techniques on the hole program representation to identify predictable data accesses. It will be understood to one skilled in the art that dependence analysis techniques can include employing standard data dependence characteristics of the program code under analysis, which can be similar to parallelization and/or vectorization techniques. In a particular embodiment, whole program analyzer and optimizer module 30 is configured to perform automatic dependence analysis techniques. In an alternate embodiment, whole program analyzer and optimizer module 30 is configured to perform guided dependence analysis techniques based on user input received from a user through user interface 60.

In an alternate embodiment, whole program analyzer and optimizer module 30 is configured to perform automatic dependence analysis techniques and guided dependence analysis techniques based on user input received from a user through user interface 60. Thus, in a particular embodiment, whole program analyzer and optimizer module 30 can be configured to perform automatic dependence analysis techniques and to receive hints, suggestions, and/or other input from a user. Therefore, compiler 10 can be configured to perform foundational dependence analysis techniques, with additional customization and optimization from the programmer. Accordingly, compiler 10 can perform complicated, tedious, and/or other dependence analysis tasks suitable for automation, with additional optimization by the programmer, thereby reducing the time and effort required by the programmer to perform the tasks. It will be understood to one skilled in the art that other configurations can also be employed.

Additionally, in one embodiment, whole program analyzer and optimizer module 30 can also be configured to employ the results of the automatic and/or guided dependence analysis techniques in a whole program analysis. In particular, the results of the automatic and/or guided parallelization techniques can be employed in a whole program analysis that includes loop blocking and/or unimodular transformation to expose additional, or secondary, predictable accesses. In one embodiment, whole program analyzer and optimizer module 30 is configured to apply the results automatically. In an alternate embodiment, whole program analyzer and optimizer module 30 is configured to employ the results based on user input. Thus, compiler 10 can be configured to free the application programmer from managing the complex details involved in identifying predictable data accesses, while allowing for ultimate programmer control. It will be understood to one skilled in the art that other configurations can also be employed.

Additionally, whole program analyzer and optimizer module 30 can be configured to aggregate identified predictable data accesses, as will be understood to one skilled in the art. Thus, whole program analyzer and optimizer module 30 can be configured to reduce DMA traffic in the multi-processing system, through aggregation of predictable data accesses. Additionally, whole program analyzer and optimizer module 30 can be configured to restructure received program code based on the aggregation of predictable data accesses, as will be understood to one skilled in the art. In one embodiment, restructuring received program code includes annotating the whole program representation to indicate the restructured program procedures. In one embodiment, whole program analyzer and optimizer module 30 can be configured to automatically restructure received program code. In an alternate embodiment, whole program analyzer and optimizer module 30 can be configured to restructure received program code based on user input received from a user. It will be understood to one skilled in the art that other configurations can also be employed.

Compiler 10 also includes prefetch optimization partitioning module 40. Prefetch optimization partitioning module 40 is a circuit or circuits or other suitable logic and is configured, generally, to insert scheduling code to achieve the restructured data accesses and to insert code to update a directory of the software managed cache.

In particular, in one embodiment, prefetch optimization partitioning module 40 is configured to generate explicit prefetch commands for the identified predictable data accesses. It will be understood to one skilled in the art that generating explicit prefetch commands can include scheduling code to achieve prefetching on-time with respect to a data flow within the program, including identifying data and/or command flow points within the program.

Additionally, prefetch optimization partitioning module 40 is configured to insert generated explicit prefetch commands within the program code to effect the data prefetching at the appropriate flow point in the program. Moreover, prefetch optimization partitioning module 40 is configured to generate and insert appropriate code to update the software cache directory based on the inserted explicit prefetch commands, as will be understood to one skilled in the art. Thus, compiler 10 can be configured to optimize data prefetching within the program. Accordingly, random accesses to the same data, which are made through the caching scheme, will thus find the correct data. However, the identified predictable data accesses are reconfigured to eliminate a cache lookup, based on the explicit prefetch commands. Therefore, the identified predictable data accesses, often the most important and frequent accesses within a program, will not suffer the overhead of a cache lookup, which can significantly reduce data access latency. Moreover, the predictable accesses to shared variable by different processors will not require invalidation transactions and/or operations, which can also significantly reduce data access latency.

Accordingly, compiler 10 can be configured to automate certain time-intensive programming activities, such as identifying various predictable data accesses and restructuring the program code to optimize prefetch operations in a software managed cache, thereby shifting the burden from the human programmer who would otherwise have to perform the tasks. Thus, compiler 10 can be configured to partition computer program code for software managed cache optimization in a multi-processing environment, in particular, by eliminating redundant cache lookups.

Figure 2:
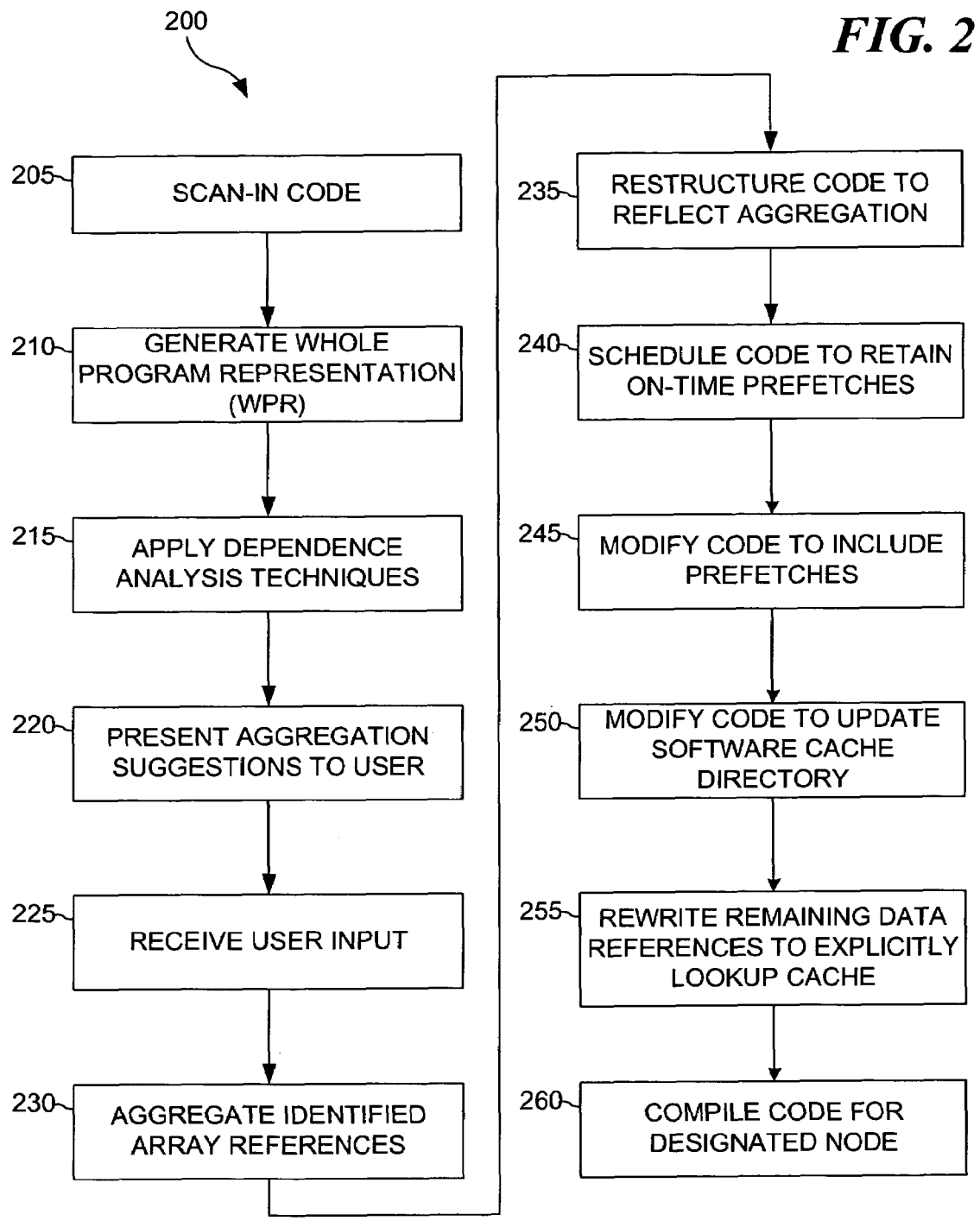
FIG. 2 is a flow diagram depicting a software managed cache optimization method.

Referring to FIG. 2 of the drawings, the reference numeral 200 generally designates a flow chart depicting a software managed cache optimization method. The process begins at step 205, wherein computer program code to be analyzed is received or scanned in. This step can be performed by, for example, a compiler front end and/or front end code module 20 or object file reader module 25 of FIG. 1. It will be understood to one skilled in the art that receiving or scanning in code to be analyzed can include retrieving data stored on a hard drive or other suitable storage device and loading the data into a system memory. Additionally, in the case of the compiler front end and/or front end code module 20, this step can also include parsing a source language program and producing an intermediate form code. In the case of object file reader module 25, this step can include extracting an intermediate representation from an object code file of the computer program code.

At next step 210, a whole program representation is generated based on received computer program code. This step can be performed by, for example, whole program analyzer and optimizer module 30 of FIG. 1. This step can include conducting Inter Procedural Analysis, as will be understood to one skilled in the art. At next step 215, dependence analysis techniques are applied to the whole program representation to identify predictable data accesses that can be profitable aggregated. This step can be performed by, for example, whole program analyzer and optimizer module 30 of FIG. 1. This step can include employing standard data dependence analysis, quasi-parallelization techniques, quasi-vectorization techniques, loop blocking, unimodular transformation and/or other techniques, as will be understood to one skilled in the art.

At next step 220, aggregation suggestions are presented to a user for user input, based on the dependence analysis techniques. This step can be performed by, for example, whole program analyzer and optimizer module 30 and user interface 60 of FIG. 1. At next step 225, user input is received. This step can be performed by for example, whole program analyzer and optimizer module 30 and user interface 60 of FIG. 1. It will be understood to one skilled in the art that this step can include aggregation suggestions accepted and/or rejected by the user.

At next step 230, the identified array references are aggregated. This step can be performed by, for example, whole program analyzer and optimizer module 30 of FIG. 1. It will be understood to one skilled in the art that aggregating the identified array references can include annotating the whole program representation. At next step 235, the program code is restructured to reflect the aggregated array references. This step can be performed by, for example, whole program analyzer and optimizer module 30 of FIG. 1.

At next step 240, the restructured code is scheduled to retain on-time prefetches within the program flow. This step can be performed by, for example, prefetch optimization partitioning module 40 of FIG. 1. At next step 245, the restructured code is modified to include explicit prefetches based on the aggregated array references. This step can be performed by, for example, prefetch optimization partitioning module 40 of FIG. 1.

At next step 250, the restructured code is modified to include software cache directory updates based on the explicit prefetches. This step can be performed by, for example, prefetch optimization partitioning module 40 of FIG. 1. At next step 255, any remaining data references are replaced with code to lookup the software cache, returning the data from a buffer for loads, or storing data in a buffer for stores if the lookup is successful or hits. For a miss, a compiler included subroutine, the miss handler, is invoked. The miss handler initiates a DMA or data transfer between one of the at least one system memories and the local store containing the software cache buffers, or lines. This retrieves the missing data from system memory. Furthermore, the miss handler will normally need to replace an existing line to make room for the new data that is transferred. In cases where this is necessary, a further transfer will be initiated to copy this evicted data back to system memory. The miss handler will also update the cache directories to reflect the new contents of the cache lines. Data that has been recorded in the cache directories by the data aggregation/prefetching code is not evicted, since the code generated for these accesses has no way of recovering from such an event. These lines must be explicitly released by instructions inserted by the compiler at the appropriate code locations.

At next step 260, the modified code is compiled to generate processor specific code, as appropriate, and the process ends. This step can be performed by, for example, processor specific backend module 50 of FIG. 1.

Thus, a computer program can be partitioned into segments that aggregate predictable data references, with explicit prefetch modifications to eliminate redundant cache lookups, based on data dependence analysis techniques, to optimize a software managed cache in a multi-processing environment. Accordingly, computer program code designed for a multiprocessor system employing a software-managed cache can be optimized in an efficient manner. In particular, some of the tedious and/or time-consuming aspects of software cache optimization in a multi-processing environment can be automated or semi-automated, which can significantly reduce the time and/or expertise required by an application developer, and increase the accessibility of the multiprocessing system to program developers of varying skill levels.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for computer program code optimization for a software managed cache in either a uni-processor or a multi-processor system, comprising:
    receiving a single source file comprising a plurality of array references;
    analyzing the plurality of array references to identify predictable accesses;
    analyzing the plurality of array references to identify secondary predictable accesses;
    aggregating one or more of the plurality of array references based on identified predictable accesses and identified secondary predictable accesses to generate aggregated references;
    restructuring the single source file based on the aggregated references to generate restructured code;
    inserting prefetch code in the restructured code based on the aggregated references;
    inserting software cache update code in the restructured code based on the aggregated references;
    inserting explicit cache lookup code for the remaining unpredictable accesses;
    inserting calls to a miss handler for misses in the explicit cache lookup code;
    including a miss handler in the generated code for the program;
    in the miss handler, choosing a line to evict based on recent usage and predictability; and
    in the miss handler, issuing appropriate DMA commands for the evicted line and the missing line.

2. The method as recited in claim 1, wherein analyzing the plurality of array references to identify predictable accesses comprises dependence analysis techniques.

3. The method as recited in claim 1, wherein analyzing the plurality of array references to identify predictable accesses comprises quasi-parallelization techniques.

4. The method as recited in claim 1, wherein analyzing the plurality of array references to identify predictable accesses comprises quasi-vectorization transformations.

5. The method as recited in claim 1, wherein analyzing the plurality of array references to identify secondary predictable accesses comprises loop blocking analysis.

6. The method as recited in claim 1, wherein analyzing the plurality of array references to identify secondary predictable accesses comprises unimodular transformations.

7. A processor for computer program code optimization for a software managed cache in either a uni-processor or a multi-processor system, the processor include a computer program, comprising:
    computer program code for receiving a single source file comprising a plurality of array references;
    computer program code for analyzing the plurality of array references to identify predictable accesses;
    computer program code for analyzing the plurality of array references to identify secondary predictable accesses;
    computer program code for aggregating one or more of the plurality of array references based on identified predictable accesses and identified secondary predictable accesses to generate aggregated references;
    computer program code for restructuring the single source file based on the aggregated references to generate restructured code;
    computer program code for inserting prefetch code in the restructured code based on the aggregated references;
    computer program code for inserting software cache update code in the restructured code based on the aggregated references;
    computer program code for inserting explicit cache lookup code for the remaining unpredictable accesses;
    computer program code for inserting calls to a miss handler for misses in the explicit cache lookup code;
    computer program code for including a miss handler in the generated code for the program;
    in the miss handler, computer program code for choosing a line to evict based on recent usage and predictability; and
    in the miss handler, computer program code for issuing appropriate DMA commands for the evicted line and the missing line.

8. The processor as recited in claim 7, wherein analyzing the plurality of array references to identify predictable accesses comprises dependence analysis techniques.

9. The processor as recited in claim 7, wherein analyzing the plurality of array references to identify predictable accesses comprises quasi-parallelization techniques.

10. The processor as recited in claim 7, wherein analyzing the plurality of array references to identify predictable accesses comprises quasi-vectorization transformations.

11. The processor as recited in claim 7, wherein analyzing the plurality of array references to identify secondary predictable accesses comprises loop blocking analysis.

12. The processor as recited in claim 7, wherein analyzing the plurality of array references to identify secondary predictable accesses comprises unimodular transformations.

13. A method for improving performance of software managed cache in either a uni-processor or a multiprocessor system by compiler analysis of predictable data accesses associated with execution of a program, comprising:
  analyzing data references of said program;
  detecting from said analyzing selected ones of said data references that depend in a predictable manner on a program variable;
  making explicit prefetches for said selected ones of said data references; and
  updating a directory of said software cache to indicate that data corresponding to said data references is available;
  inserting explicit cache lookup code for the remaining unpredictable accesses;
  inserting calls to a miss handler for misses in the explicit cache lookup code;
  including a miss handler in the generated code for the program;
  in the miss handler, choosing a line to evict based on recent usage and predictability; and
  in the miss handler, issuing appropriate DMA commands for the evicted line and the missing line.

14. The method as recited in claim 13, wherein analyzing data references of said program comprises dependence analysis techniques.

15. The method as recited in claim 13, wherein analyzing data references of said program comprises quasi-parallelization techniques.

16. The method as recited in claim 13, wherein analyzing data references of said program comprises quasi-vectorization transformations.

17. The method as recited in claim 13, wherein detecting from said analyzing comprises loop blocking analysis.

18. The method as recited in claim 13, wherein detecting from said analyzing comprises unimodular transformations.

19. The method as recited in claim 13, further comprising aggregating said data references that depend in a predictable manner on a program variable.

* * * * *